United States Patent [19]

Slane et al.

[11] Patent Number: 4,786,499

[45] Date of Patent: Nov. 22, 1988

[54] LITHIUM ELECTROCHEMICAL CELL INCLUDING APROTIC SOLVENT-DIALKYL CARBONATE SOLVENT MIXTURE

[75] Inventors: Steven M. Slane, Neptune; Edward J. Plichta, Freehold; Mark Salomon, Fairhaven; Michelle C. Uchiyama, Somerset, all of N.J.

[73] Assignee: The United States of America as represented by the Secretary of the Army, Washington, D.C.

[21] Appl. No.: 125,642

[22] Filed: Nov. 1, 1987

[51] Int. Cl.4 .......................... H01M 6/14; H01M 4/58
[52] U.S. Cl. ..................................... 429/197; 429/218; 429/194
[58] Field of Search ........................ 429/194, 218, 197

[56] References Cited

U.S. PATENT DOCUMENTS 3,544,385 12/1970 Newman ............................. 429/197
3,884,723 5/1975 Wuttke ............................. 429/194 X
4,228,226 10/1980 Christian et al. ................ 429/218 X
4,707,422 11/1987 DeNeufville et al. .......... 429/101 X

OTHER PUBLICATIONS

Organic Electrolyte For Use in a Lithium Rechargeable Electrochemical Cell and Lithium Rechargeable Electrochemical Cell Including Said Organic Electrolyte, Ser. No. 070,753, filed 6 Jul. 1987, Inventors: Edward J. Plichta, Steven M. Slane, Mark Salomon.

Primary Examiner—Brian E. Hearn
Assistant Examiner—Stephen J. Kalafut
Attorney, Agent, or Firm—Sheldon Kanars; Roy E. Gordon

[57] ABSTRACT

An electrochemical cell is provided including lithium as the anode, non-stoichiometric $V_6O_{13}$ as the cathode, and a solution of a lithium salt in a mixed organic solvent of a non-aqueous aprotic solvent and a dialkyl carbonate as the electrolyte.

2 Claims, 2 Drawing Sheets

LITHIUM ELECTROCHEMICAL CELL INCLUDING APROTIC SOLVENT-DIALKYL CARBONATE SOLVENT MIXTURE

The invention described herein may be manufactured, used, and licensed by or for the Government for governmental purposes without the payment to us of any royalty thereon.

This invention relates in general to a lithium electrochemical cell and in particular, to a lithium electrochemical cell including lithium as the anode, non-stoichiometric (ns)-$V_6O_{13}$ as the cathode, and a solution of a lithium salt in a mixed organic solvent of a non-aqueous aprotic solvent and a dialkyl carbonate as the electrolyte.

BACKGROUND OF THE INVENTION

This application is copending with U.S. patent application Ser. No. 070,753 filed July 6, 1987 for "Organic Electrolyte For Use In A Lithium Rechargeable Electrochemical Cell and Lithium Rechargeable Electrochemical Cell Including Said Organic Electrolyte" and assigned to a common assignee. In that application, there is described and claimed a lithium rechargeable electrochemical cell including lithium as the anode, the lithium intercalating compound $Li_xCoO_2$ ($0<X<1$) as the cathode, 1 to 2 mol $dm^{-3}$ $LiAsF_6$ in dimethylcarbonate or 1 to 2 mol $dm^{-3}$ $LiAsF_6$ in dimethylcarbonate mixtures with methyl formate in which the mass percent of the dimethylcarbonate component can vary from 25 mass percent to 100 mass percent as the electrolyte.

Another lithium intercalating compound, to wit, ns-$V_6O_{13}$, is particularly attractive for battery applications because of its inherently high energy content. However, the known ns-$V_6O_{13}$ cathode material/solvent combinations are either unstable with the cell components or susceptible to severe oxidation during charge and reduction during discharge which results in losses in cell capacity and cycle-life. In addition to oxidation and reduction of the electrolyte, both the cathode and anode are subject to reaction with the solvent and electrolyte. This can result in poor lithium cyclability and structural rearrangement of the active material which may limit rechargeability.

SUMMARY OF THE INVENTION

The general object of this invention is to provide an improved lithium electrochemical cell including ns-$V_6O_{13}$ as the cathode active material. A more particular object of the invention is to provide an intercalating solvent system for ns-$V_6O_{13}$ that produces higher energy lithium cells.

It has now been found that the aforementioned objects can be attained by employing a system including lithium as the anode, ns-$V_6O_{13}$ as the cathode, and a solution of a lithium salt in a mixed organic solvent of a non aqueous aprotic solvent such as methyl formate and methyl acetate (MF and MA, respectively) and a dialkyl carbonate such as dimethyl carbonate (DMC) or diethyl carbonate (DEC) as the electrolyte.

The use of mixed organic solvents containing a carbonate solvent offers many advantages over currently available solvents in lithium cells. For example, the use of non-aqueous aprotic solvents such as MF and MA provide high conductivities, but perform poorly as electrolyte solutions in lithium cells. On the other hand, carbonate electrolyte solutions have relatively low conductivities but high lithium cycling efficiency and are more resistant to oxidation and reduction. The use of solvent mixtures containing a dialkyl carbonate component such as MF with DMC or DEC and MA with DMC or DEC combines the desirable characteristics of the single solvent systems and thus display superior performance characteristics in lithium cells. In particular, these types of electrolytes can achieve high energy densities with significantly increased cycle life when utilized in lithium cells, and in particular with those cells in which the cathode is an intercalation compound.

For example, the use of 1-2 mol $dm^{-3}$ $LiAsF_6$ in MF/DMC solvent mixtures where the DMC content is at least 25 mass percent has been demonstrated as being superior to other electrolyte formulations for the rechargeable Li/ns-$V_6O_{13}$ cell. An experimental energy density based on active material of 640 Wh/kg is initially obtained and upon cycling, energy densities greater than 350 Wh/kg are maintained for 100 discharge/charge cycles at a discharge current density of 2mA/cm$^2$. Li/ns-$V_6O_{13}$ cells using non-aqueous aprotic solvents such as MA or MF alone, deteriorate to below 350 Wh/kg after just 25 discharge/charge cycles. A significant increase of solvent stability with lithium has been realized with MF-DMC and MF-DEC mixtures. An average lithium cycling efficiency of 85 percent can be achieved with 1.9 mol $dm^{-3}$ $LiAsF_6$ in 47 mass percent MF - 53 mass percent DMC compared to efficiencies of respectively, 30 percent, 71 percent and 80 percent for the pure solvents MA, MF and DMC.

Moreover, the Li/MF-DMC/ns-$V_6O_{13}$ system can reversibly handle higher current densities on extended cycling with minimal losses in capacity than previously reported with a vanadium oxide material.

DETAILED DESCRIPTION OF THE PREFERRED EMBODIMENT

The cathode material, ns-$V_6O_{13}$, is prepared by the thermal decomposition of $NH_4VO_3$ (<45 minutes) at 450° C. in a tube furnace under a flow of argon.

A cathode mix is then prepared of 70 weight percent active material, ns-$V_6O_{13}$, 20 weight percent conductive diluent such as Vulcan XC-72, and 10 weight percent binder such as Teflon using an aqueous Teflon emulsion. The weight percent of active material may range from 60 to 90 percent. The weight percent of conductive diluent may range from 30 to 0 percent and the weight percent of binder may range from 1 to 15 percent. Other conductive diluents such as Shawinigan Acetylene Black, graphites or other conductive materials may be used. In addition, other binders such as polyolefins or elastomers may be substituted for Teflon. The cathode mix is rolled onto an Exmet Nickel or aluminum screen and sintered under vacuum at 280° C.

Figure 2:
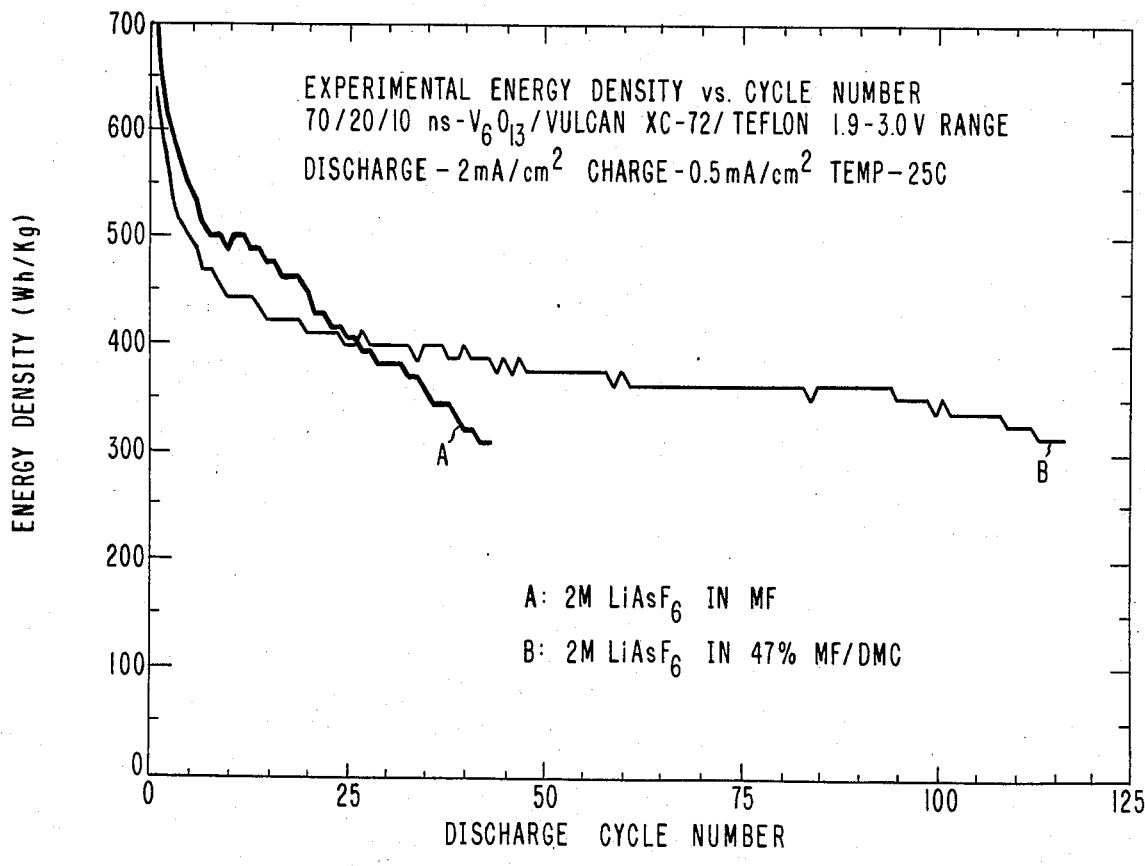
FIG. 2 illustrates the experimentally obtained energy densities based on active material as a function of discharge cycle number for lithium cells using cathode solvent combinations ns-$V_6O_{13}$ and ns-$V_6O_{13}$/MF-DMC.
Figure 3:
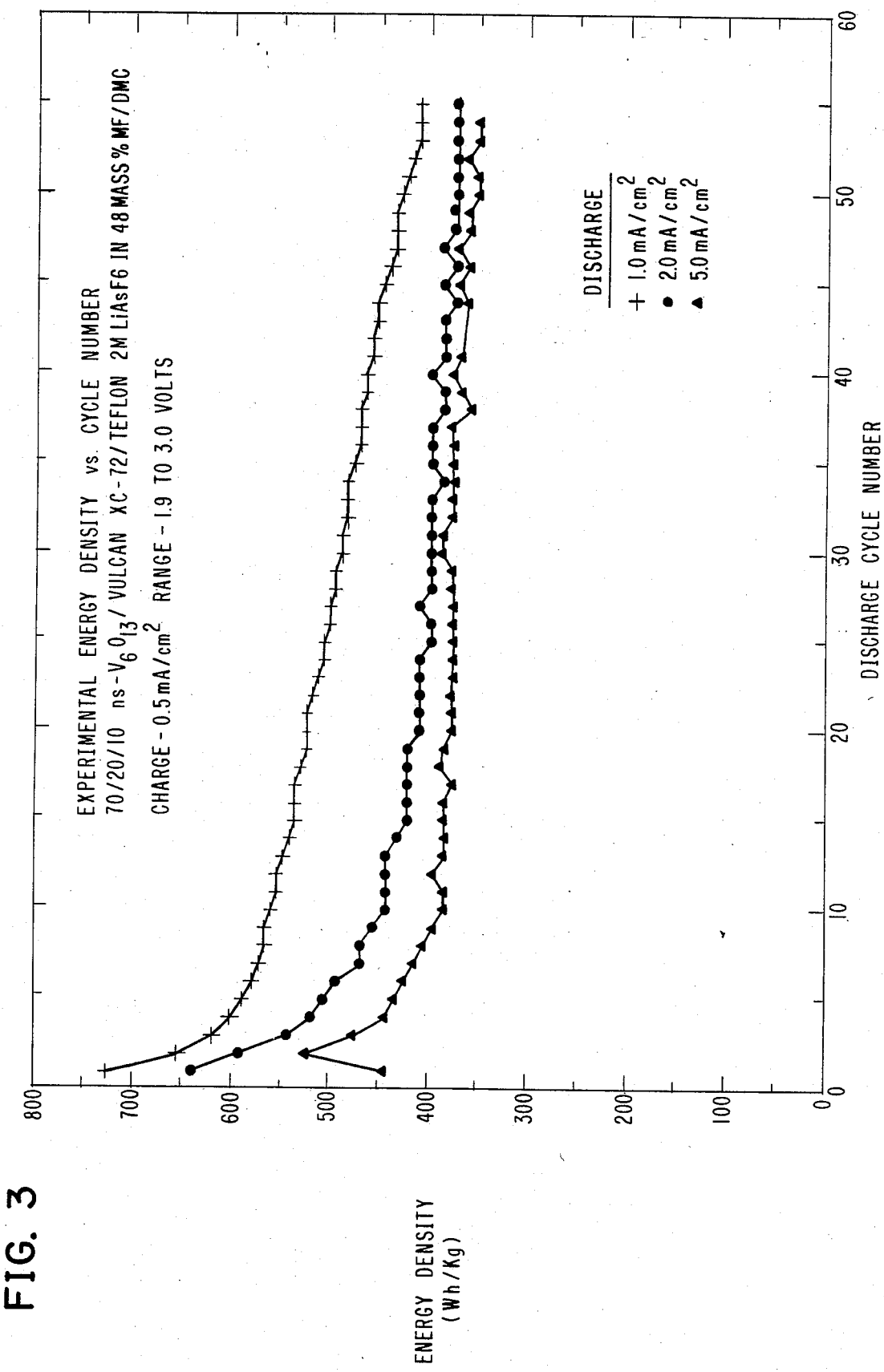
FIG. 3 illustrates the experimental energy densities based on active material versus discharge cycle number obtained at three different discharge current densities for lithium cells using the new cathode solvent combinations, ns-$V_6O_{13}$/MF-DMC.

The electrolyte for the system, as demonstrated in FIG. 2 and FIG. 3 includes the use of 1-2 mol dm$^{-3}$ LiAsF$_6$ in a solvent mixture of 47 mass percent MF - 53 mass percent DMC. Other solvent mixtures such as MF-DEC, MA-DMC, MA-DEC or other non-aqueous aprotic solvent-dialkyl carbonate mixtures can also be used. In addition, other lithium salts can be used as LiAlCl$_4$ or LiClO$_4$.

Figure 1:
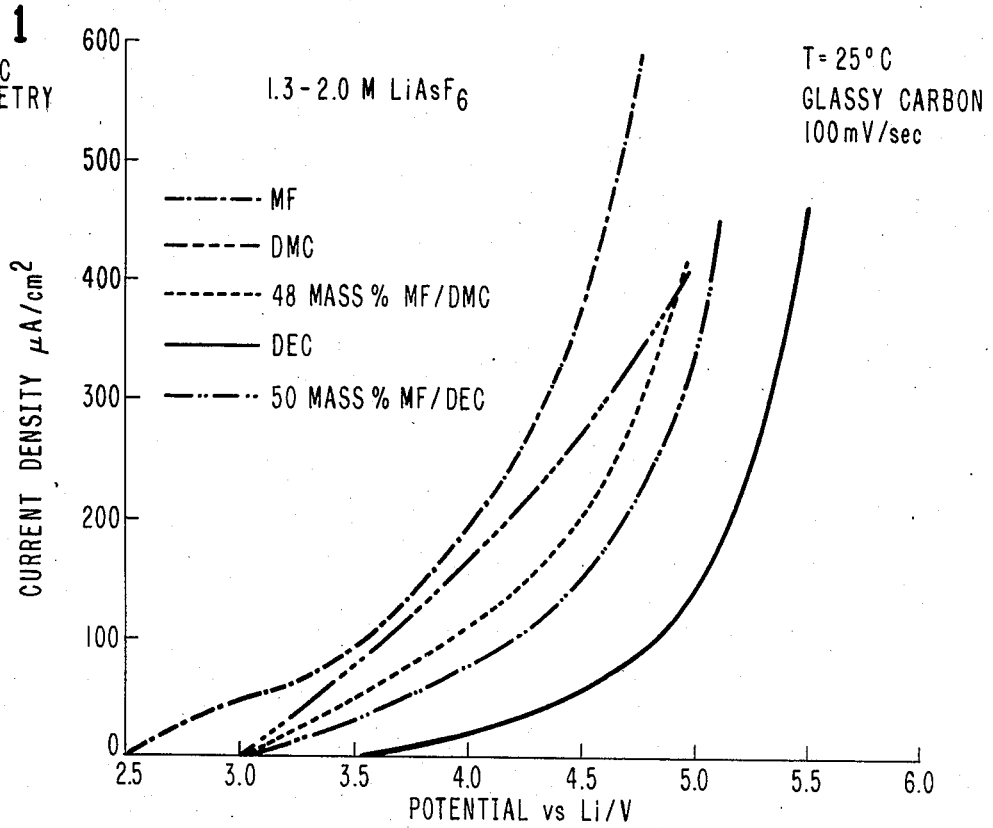
FIG. 1 is a cyclic voltammetry of $LiAsF_6$ containing electrolytes at a glassy carbon electrode versus a lithium reference and using a 100 mV/sec scan rate.

Solutions containing 1.3 to 2.0 mol dm$^{-3}$ LiAsF$_6$ in MF-DMC and MF-DEC mixtures are determined to have a greater resistance to oxidation at higher potentials than other electrolytes. FIG. 1 shows the improved stability or resistance to oxidation of LiAsF$_6$ in MF-DMC and MF-DEC mixtures compared to pure MF and DMC solutions. DEC by itself is a satisfactory candidate for use as an electrolyte. However, its relatively low specific conductance limits its use in a rechargeable lithium cell.

Another imporant feature of LiAsF$_6$ solutions in MF-DMC and MF-DEC is the greatly improved lithium cycling efficiency. This is demonstrated by plating and stripping lithium between two solid lithium electrodes. A total plating capacity of 10 C/cm$^2$ is used with plating and stripping current densities of 1.0 mA/cm$^2$. Average lithium cycling efficiencies of 85 percent for 1.9 mol dm$^{-3}$ LiAsF$_6$ in 47 mass percent MF - 53 mass percent DMC and 83 percent for 1.9 mol dm$^{-3}$ LiAsF$_6$ in 50 mass percent MF - 50 mass percent DEC are attained. These efficiencies exceed those obtained for other electrolyte solutions which are typically 80 percent or lower.

The improved cell performance with the lithium intercalating oxide cathode ns-V$_6$O$_{13}$ and non-aqueous aprotic-dialkyl carbonate electrolytes is demonstrated in FIG. 2. The laboratory cells including Li/LiAsF$_6$ MF (53 mass percent)-DMC (47 mass percent)/ns-V$_6$O$_{13}$ show excellent capacity and much improved cycle life compared to those using pure MF electrolyte solutions. More than 100 cycles are achieved with energy densities over 350 Wh/kg at a discharge current density of 2 mA/cm$^2$. In addition, the non-aqueous aprotic-dialkyl carbonate electrolytes enable lithium cells to operate better at higher rates. This is demonstrated with the Li/ns-V$_6$O$_{13}$ cell shown in FIG. 3. Discharge current densities of 1.0, 2.0 and 5.0 mA/cm$^2$ are shown for this cell with an electrolyte of LiAsF$_6$(2.0 mol dm$^{-3}$) in 47 mass percent MF - 53 mass percent DMC. Performance is significantly superior to previous results based on any pure aprotic solvent, or any mixed solvent which does not contain a dialkyl carbonate.

We wish it to be understood that we do not desire to be limited to the exact details as described for obvious modifications will occur to a person skilled in the art.

What is claimed is:

1. An electrochemical cell comprising lithium as the anode, non-stoichiometric V$_6$O$_{13}$, as the cathode, and a solution of lithium salt in a mixed organic solvent of methyl formate and diethylcarbonate as the electrolyte.

2. An electrochemical cell comprising lithium as the anode, non-stoichiometric V$_6$O$_{13}$ as the cathode, and a solution of lithium salt in a mixed organic solvent of methyl acetate and diethylcarbonate as the electrolyte.

* * * * *